July 25, 1961     R. W. HESTER     2,993,321
LAWN MOWER WITH TILTABLE TOP

Filed June 6, 1956     3 Sheets-Sheet 1

INVENTOR.
Robert W. Hester
BY
ATTORNEY.

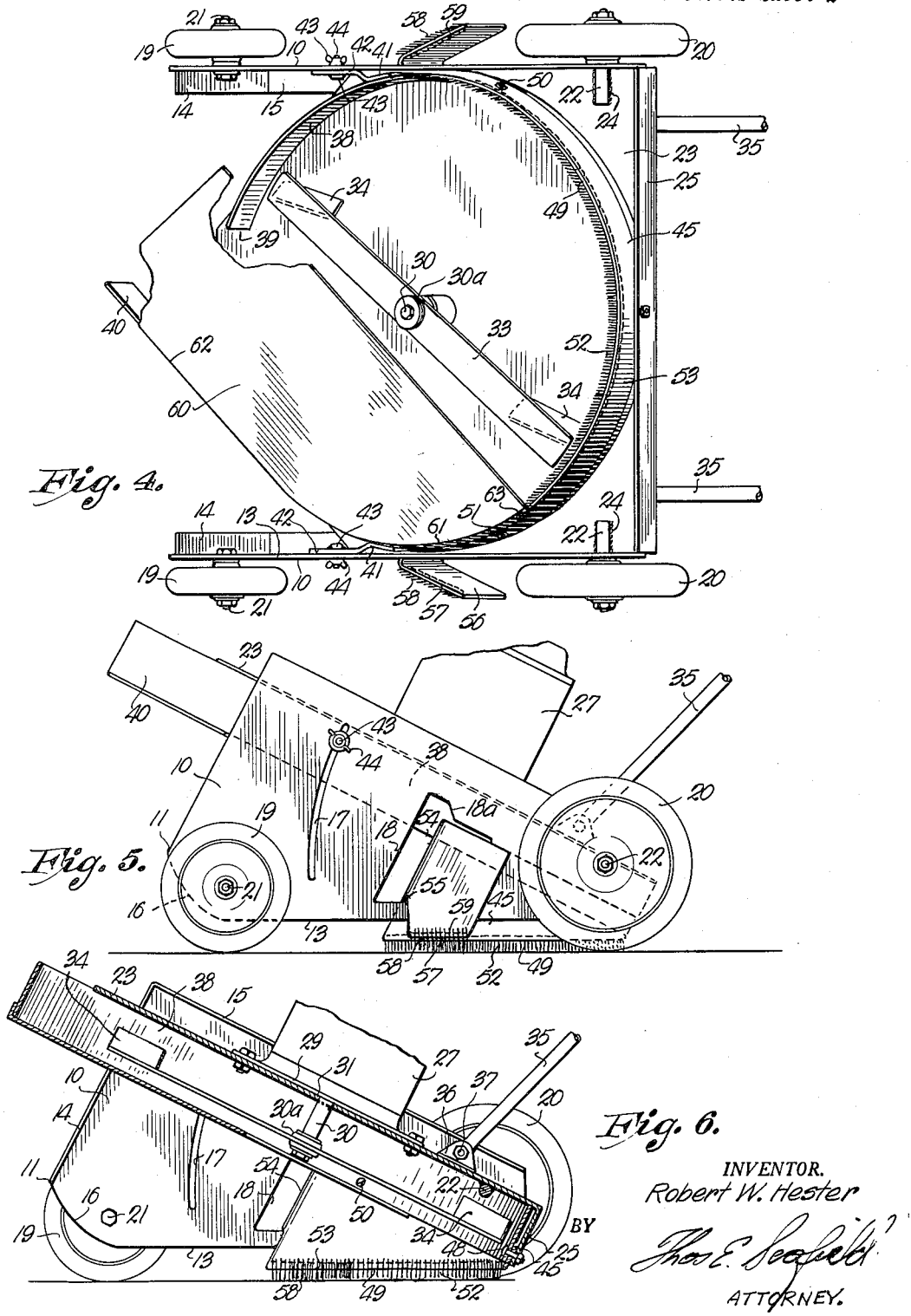

INVENTOR.
Robert W. Hester
BY Thos. E. Scofield
ATTORNEY.

United States Patent Office 2,993,321
Patented July 25, 1961

2,993,321
LAWN MOWER WITH TILTABLE TOP
Robert W. Hester, 6001 Johnson Drive, Mission, Kans.
Filed June 6, 1956, Ser. No. 589,725
4 Claims. (Cl. 56—25.4)

This invention relates to both lawn mowers of the rotary blade type and snow removal devices and refers more particularly to a combination apparatus which is adaptable to both the lawn mowing and snow removal functions with a minimum of adjustment of the parts and a minimum of addition to or removal of parts therefrom in changing from one to the other. The inventive construction is additionally adaptable to other uses such as leaf pickup and removal from lawns as well as the grass cutting and snow removal.

Therefore, an object of the invention is to provide a combination lawn mower, yard sweeper or cleaner and snow removal apparatus.

Another object of the invention is to provide a combination lawn mower, yard sweeper and snow removal device utilizing a rotating blade contained within a protective housing, said device having a power source attached to the side of the housing opposite the blade and directly connected thereto by a drive shaft.

Another object of the invention is to provide a combination lawn mower, leaf pickup apparatus and snow removal device which is convertible from the lawn mower adaptation to either of the latter two modifications with a minimum adjustment of the parts of the machine relative one another and addition of parts thereto.

Another object of the invention is to provide a combination lawn mower, leaf pickup device and snow removal device, the snow removal modification operating with a minimum amount of splatter or spray of snow from the front thereof.

Another object of the invention is to provide a combination lawn mower, leaf pickup device and snow blower or removal device utilizing a rotating blade, all of which modifications provide maximum protection for the operator and shielding of the rotating blade.

Another object of the invention is to provide a combination lawn mower, leaf pickup device and snow remover having a rigid, one-piece top plate mounting the power source for a rotating blade, the top plate being tiltable upward from a horizontal lawn mowing position to permit operation in the other uses.

Another object of the invention is to provide a combination lawn mower, yard cleaning device and snow remover wherein means for aggregating leaves or snow in the latter two modifications are provided including pickup means attached to the rear of the apparatus to move the leaves or snow into the track of the rotating blade.

Another object of the invention is to provide a combination lawn mower, yard sweeper or leaf removal device and snow blower supported by wheels including means positionable thereon in front of the set of wheels carrying the greatest portion of the weight of the device to minimize the packing of snow by said wheels and thereby avoid packed down tracks in the snow.

Yet another object of the invention is to provide a combination lawn mower, leaf pickup device and snow blower which is simple in construction, cheap to manufacture, rugged and positive acting and efficient in all of its functions.

Another object of the invention is to provide a device as described which uses interchangeable blades for its differing functions.

Other and further objects of the present invention will appear in the course of the following description thereof.

In the drawings, which form a part of the instant specification and are to be read in conjunction therewith, embodiments of the invention are shown and, in the various views, like numerals are employed to indicate like parts.

FIG. 4 is a bottom plan view of the preferred modification of the inventive apparatus adjusted for the snow removal use.

FIG. 5 is a side view of the inventive apparatus as shown in FIG. 4 with the device adjusted for snow removal.

FIG. 6 is a side-sectional view of the preferred modification of the inventive apparatus adjusted for snow removal use.

Figure 2:
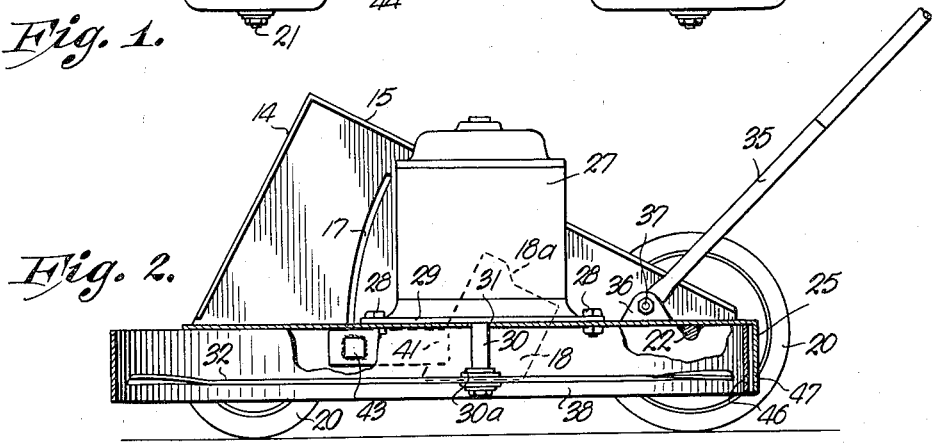
FIG. 2 is a view taken along the lines 2—2 of FIG. 1 in the direction of the arrows.

In FIGS. 2, 4 and 5, parts have been broken away for purposes of illustration or shown in dotted lines also to better illustrate the inventive construction.

Referring to the drawings, and more particularly to FIGS. 1–6 which show a preferred modification of the invention, a pair of substantially parallel frame members 10 comprise the side members of the construction and have each front and rear ends 11 and 12. Frame members 10 preferably comprise each an essentially triangular sheet having a base 13 preferably longer than either of the upwardly extending sides which meet at a vertex thereabove. The two upwardly extending side edges preferably are flanged over inwardly as at 14 and 15. The front and rear lower vertices of the triangular sheets 10 are preferably rounded off as shown at 16 in FIG. 6. Openings are formed in each frame member sheet 10 adjacent the front and rear ends to receive axles of wheels to be described later. The openings are not shown in the figures. The opening near the rear end 12 of the sheets 10 is preferably formed slightly further above the bottom edge 13 of the sheets than the opening for the front axle so the rear wheel may be of greater diameter than the front wheel while maintaining the bottom edge of the side frame sheets essentially parallel to the ground. An arced slot 17 is formed in each of the side sheets forward of the openings for the rear axles and preferably rearwardly of the openings for the front axles. The slots 17 are preferably formed as an arc of a circle having a center in the center of the rear axle opening in each respective sheet 10. Enlarged orifices 18 are formed in each of the frame member sheets 10 between the slots 17 and the rear axle openings. The purpose and nature of these orifices 18 will be later described.

The side frame members 10 need not be metallic sheets of the character previously described but this form has proved convenient to provide (1) rigid longitudinal wheel axle supports, (2) rigid upward extensions to support the blade housing when tilted upwardly, and (3) lateral protection for the operator or others, especially when the housing is tilted upwardly.

Pairs of front and rear wheels 19 and 20, respectively, are rotatably mounted on stub axles 21 and 22 which are fixed to the front and rear ends of frame members 10, respectively, and extend through the openings previously mentioned therein. The rear axles 22 are preferably longer than the front axles 21 for reasons to be described.

Figure 1:
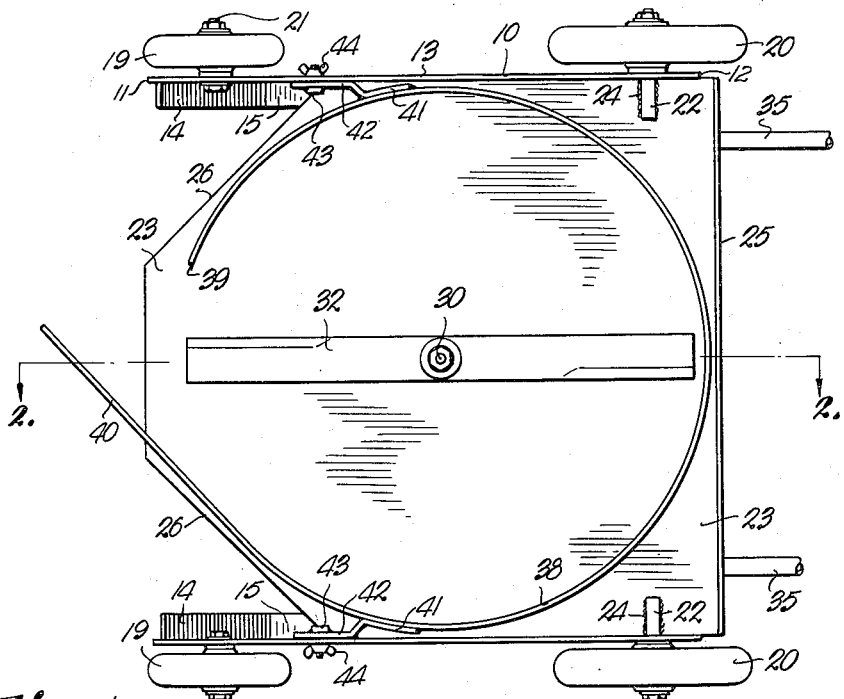
FIG. 1 is a bottom plan view of a preferred modification of the inventive device adjusted for lawn mower use.

Top plate 23 is pivotally mounted adjacent its rearmost end relative the rear ends of the frame members 10. Plate 23 is preferably fixed as at 24 to the rear axles 22. The rear wheel mounting means preferably comprises stub axles as shown. The mounting means may be fixed to either the top or bottom of the top plate 23. Top plate 23 extends forwardly of its rearmost mounting. As is best seen in FIG. 1 wherein the top plate 23 is in horizontal position for the grass cutting function, the rear edge thereof extends preferably rearwardly of the rear axles 22 and depending flange 25 thereon preferably extends downwardly essentially normal thereto to form a straight rear edge therefor. Flange 25 aids to some extent in operator protection and part mounting but is not necessary for successful function of the device. The rearward extension of the top plate 23 behind the rear axle mounting and the downward extension of the depending flange 25 must be adjusted so that the distance from the center of the rear axles 22 extended to the lower central edge of the flange 25 is less than the radius of the rear wheel 20. When such is the case, the top plate may be rotated as desired around its rear axle mounting without the lower edge of the flange 25 contacting the ground. The front edge of the top plate 23 may be angled inwardly as to 26 (FIG. 1) from a point before the top plate 23 contacts the flanged front edges 14 of the frame member 10 past slots 17.

Figure 3:
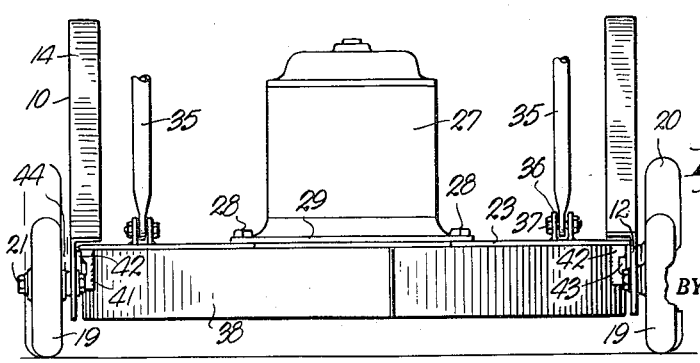
FIG. 3 is a front elevation of the preferred modification of the inventive device, the apparatus adjusted for the lawn mowing use as in FIGS. 1 and 2.

Power plant 27 is fixed to the top side of plate 23 by bolts 28 extending through mounting plate 29 and top plate 23. Power plant 27 may be of any suitable type, electrical or internal combustion. If it is of the latter type, the carburation should be such as to work at such upward displacement angles as the snow removal modification will require plus any additional terrain angles which may occur. Thus, the engine must work effectively even when positioned substantially parallel to the ground. Drive shaft 30 extends through an opening 31 in plate 23 and normal thereto. Two types of blades 32 and 33 shown in FIGS. 1-3 and 4-6 respectively, are employed. The low pitch blade as shown in FIGS. 1-3 is employed in grass cutting and a high pitch or fluted blade 33 having flutes 34 shown in FIGS. 4-6 is employed in the snow removal modification. A slip-clutch blade protection attachment 30a of conventional design may be employed if desired.

Handle 35 is attached to mounting flanges 36 by bolts 37 rearwardly of the motor. If desired, stops (not shown) may be placed on the top portion of the handles ahead of the mountings thereof to prevent any possible toppling backward of the mechanism on the operator in extreme terrain angles when the housing is in the snow removal position.

Essentially spiral or involute skirt 38 is fixed to the underside of top plate 23 and extends down normal thereto. The top plate 23 and the spiral skirt 38 comprise together a housing suitable for partially enclosing the rotating blade assembly while providing an opening for exit therefrom of cut or blown material. The opening 39 in the skirt 38 which defines the essential spiral or involute form is preferably positioned between the front ends 11 of the frame members. The wall of the skirt 38 is essentially circular from one edge of said opening 39 and remains circumferentially thus through an arc of preferably slightly greater than 270°. The wall 40 of skirt then is formed in an essentially straight line approximately tangential to the continuation of the arc of the circle. The inward angling as at 26 of the front portion of the top plate 23 is preferably slightly less than the inward angling of the wall 40 of the skirt which creates the opening 39. The straight portion 40 of the skirt wall 38 preferably extends in the direction of the rotation of the blade 32 or 33. The depth of the skirt 38 is preferably uniform and slightly greater than the distance from the lower surface of the top plate 23 to below the blade 32 or 33 when the latter is mounted on drive shaft 30. Since the rear portion of the skirt 38 is positioned ahead of the downwardly depending flange 25 (if present) of the top plate 23, the depth of the skirt 38 may be slightly greater, if desired, than the depth of the flange 25, but the distance from the center of the axles 22 extended to the lower edge of the rearmost portion of the skirt 38 should be less than the radius of the rear wheel 20 so that the skirt 38 itself will never contact the ground when the housing is raised or lowered around its rear pivot point. If the depths of the skirt 38 and rear flange 25 are the same, as in FIG. 2, there will be no problem of contact with the ground. The rearmost portion of the skirt 38 preferably extends past the rear axles 22 so that there will be some depression of the rear part of the skirt 38 toward the ground if the housing is raised at its front end.

At least a portion of the housing formed by the top plate 23 and depending skirt 38 is movably engageable adjacent said front wheels 19 with said frame members 10 whereby to be movable from a lowermost horizontal grass cutting position to an angled, raised front end position for purposes besides grass cutting, such as leaf pickup or snow removal. As shown in FIG. 1, angled plates 41 are fixed to each side of skirt 38 with free ends 42 fixedly engaged by bolts 43 having wing nuts 44. Bolts 43 extend through slots 17 in the frame member sheets 10. It should be evident that, if desired, the engaging members 41 could just as well be attached to the top plate 23 instead of the skirt 38 to give the same result since the skirt 38 is fixed to the underside of the top plate 23.

The following description relates to FIGS. 4–6 and those parts to be added to the structure already described to convert the lawn mower to the snow removal and/or leaf pickup modification. It should be appreciated that merely tilting the housing to its upward position and changing the blade from the conventional flat grass cutting type to one of greater pitch or one such as is shown in FIGS. 4–6 will provide an operable snow removal device. However, this construction per se suffers from several defects: (1) there is excessive front spatter and throw-out of snow, (2) the entire front blade area is exposed, which is undesirable from a safety standpoint, (3) uniform pickup of the snow cannot be achieved by the curved rear portion of the cylindrical skirt, (4) incomplete pickup of snow is achieved by the rear portion of the cylindrical skirt, (5) snow would tend to jam in the rear of the housing behind the cylindrical skirt, if flange 25 is present, and (6), the problem of tracking snow, especially by the rear weight carrying wheels, is not solved.

Secondary depending snow aggregating skirt 45 (FIGS. 4–6) is provided, which is removably attachable to the rear portion of the spiral skirt 38 which depends from the top plate 23. Openings 46 and 47 (see FIG. 2) are formed in the rear central portion of the depending skirt 38 and the depending flange 25 for insertion of bolt 48 therethrough to engage an orifice in the secondary depending skirt 45. The secondary depending skirt 45 is curvable or curved in vertical cross section to the outside of skirt 38 but the forwardly extending portions thereof are of greater depth, whereby, when the front of the housing is at its preferred upward deflection the bottom 49 of the secondary depending skirt 45 is essentially horizontal and parallel to the ground. The depth of the secondary depending skirt 45 is such at any point that, at the preferred upward deflection of the housing, the bottom edge 49 thereof does not touch the ground. Bolts 50 and 51 may be employed to fasten portions of the secondary depending skirt forward of the rearmost portion thereof to the outside of the primary skirt 38. The secondary skirt 45 preferably extends forwardly along the rear portion of skirt 38 on each side thereof from the rearmost portion thereof an arc equal to 90° whereby the greatest width of the depending skirt 45 is at least as great as that of the primary skirt 38. The bottom clearance of the secondary depending skirt 45 from the ground should be relatively small and less than that of the lower edges 13 of the frame members 10. The distance from the center of the rear axles 22 extended to the rearmost portion and bottom edge of the secondary skirt 45 should still be less than the radius of the rear wheel 20 whereby contact with the ground will not be made.

A brush 52 is preferably affixed to at least a portion of the lower edge of said secondary skirt 45 whereby to contact the ground. The brush 52 is preferably affixed to substantially the entire lower edge of said secondary skirt. The brush 52 is also preferably affixed as shown at 53 in FIGS. 4 and 6 pivotally near the top thereof to the front edge of the secondary skirt 45 whereby the lower portion of said brush below the attachment will abut the front of the secondary skirt below the pivot point 53 on forward motion of the device and rotate away from the front face of said secondary skirt on rearward motion of said device. Thus, if several passes are desired over a snow or leaf covered area, there will be more pickup on forward motion of the device than on rearward motion thereof.

As previously mentioned, the forwardly extending portions of the secondary skirt 45 extend midway of the forward extension of the skirt 38 itself. Orifices 18 in the side frame sheets 10 are positioned to extend both forwardly and rearwardly of this midway point. This midway point also preferably extends forwardly of the front faces of the rear wheels 20. The front edges 54 of said secondary skirt 45 preferably extend outwardly through said orifices 18, portions 55 being cut out thereof to permit riding over the lower edges of the orifices 18. Extensions 56 of said front edges 55 (or extra sheet portions attached thereto) preferably but not necessarily extend outwardly past the front faces of said rear wheels, the lower edges 57 of said extensions extending close to the ground surface at approximately the same clearance as the lower edge 49 of the secondary skirt 45 in its normal use position when the front of the housing is at any preferred upper deflection for any purpose besides grass cutting. The extensions 56 past the front faces of the rear wheels 20 are preferably rearwardly angled to deflect the snow outwardly from said rear wheels.

The front edges 55 of the secondary skirt 45 are bent outwardly through the orifices 18 in the side sheets 10 and extensions 56 thereon formed so as to clear the area in front of the rear wheels. Enlarged front portions 18a are provided in the orifices 18 to permit insertion and removal of the enlarged outer extensions 56 through the side sheets 10. Brushes 58 may be fixed as at 59 to the lower outside faces of the outer extensions 56 to sweep the ground completely in front of the wheels 20. Such brushes 58 are fixed preferably pivotally to the front faces of the extensions as is the brush 52 on the secondary skirt 45 to yield on rearward motion and catch on forward motion of the device.

Lower plate 60 having curved flanged edge 61 and straight flanged edge 62 to engage the bottom edges of skirt portions 38 and 40 respectively is provided, removably attachable by small bolts 63 or the like relative the bottom edge of said spiral skirt 38 to close off a portion thereof forward of the rear edge thereof including the area of the opening 39. Said lower plate 60 preferably extends essentially diametrically across the bottom of said spiral skirt and a portion thereof extends between the edges of the open portion 39 of said spiral skirt 38. The device is operable without both the secondary skirt 45 and lower plate 60 or either of them but not satisfactorily or at optimum. Without plate 60 leaf or snow throw is disorderly and relatively undirected and the operation is less safe because of this throw and excessive blade exposure.

In the grass cutting operation, the machine is adjusted as shown in FIGS. 1-3 with the housing, including the top plate 23 and the depending skirt 38 in an essentially horizontal position, the wing nut 44 mounting bolts 43 being fixed at the bottom of the slots 17. The machine operates by discharging its cuttings out of the front end opening 39 of the spiral skirt 38 to one side and creating a partial vacuum underneath the housing to make the grass stand up for cutting.

In snow removal or leaf pickup operation the housing is first raised at the front end through loosening the wing-type nuts 44 and moving the bolts 43 through the guides or slots 17 in the sides of the frame members 10. The entire housing pivots around the rear axles 22. The low pitch blade 32, suitable for grass cutting, is replaced by a higher pitch blade or one 33 with with blowing flutes 34 as shown in FIGS. 4-6. The housing may be raised to any desired variable level for either the snow removal or leaf pickup operations but the optimum angle will probably lie within 30° to 45° from the horizontal. Preferably, the height of the top of the slots 17 and of the frame sheets 10 themselves and the length of the housing both in front of the axles 22 and to their rear is correlated with the depth of the previously described secondary skirt assembly to obtain the best results. Varying depth skirts, however, may be employed if desired operable with various angles of elevation of the housing around its pivot point. Tightening of the wing nuts 44 on the bolts 43 will fix the housing against the frame sheets 10 in its upward position. The device is now operable in either its snow blowing or leaf pickup functions but will not be as efficient as previously noted without the secondary skirt 45 and lower plate 60 structural additions thereto.

Therefore, the secondary skirt 45 is then attached along the back of the rear half of the spiral skirt 38 for the purpose of directing snow and leaves into the path of the blade 33. The brush 52 on the secondary skirt aids in the leaf or snow pickup while the extensions 56 outside the frame members 10 clear the path of the rear wheels 20 and the brushes 58 thereon aid in this function.

The lower plate 60 is then added to minimize front throw and spatter of snow or leaves and guide the moving debris out of the spiral skirt opening in the desired direction.

When it is desired to return to the grass cutting operation, the lower plate 60 and secondary skirt 45 are easily and simply removed from the housing and the wing nuts 44 loosened on the bolts 43 to lower the housing again to the horizontal position.

Figure 7:
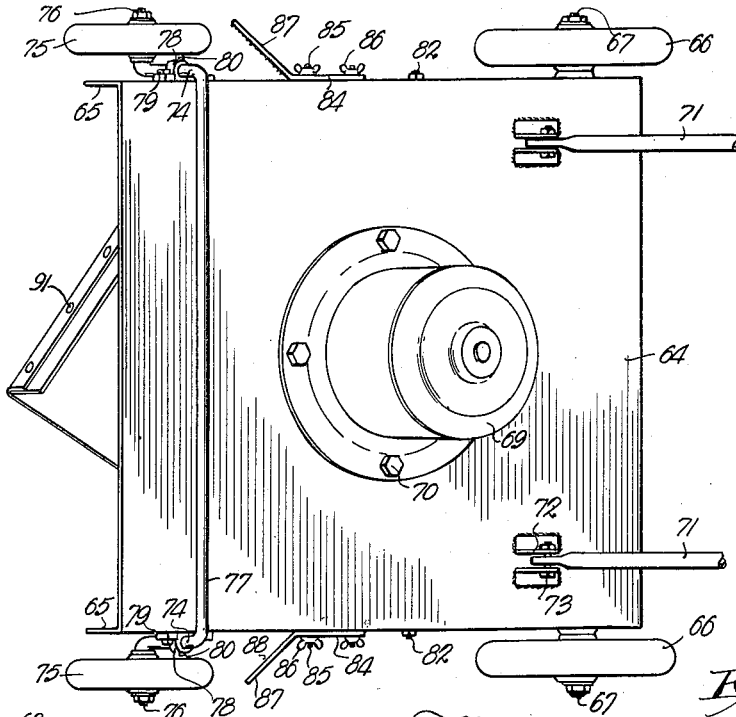
FIG. 7 is a top plan view of a second modification of the invention, the apparatus adjusted to the upper position for snow removal use.
Figure 8:
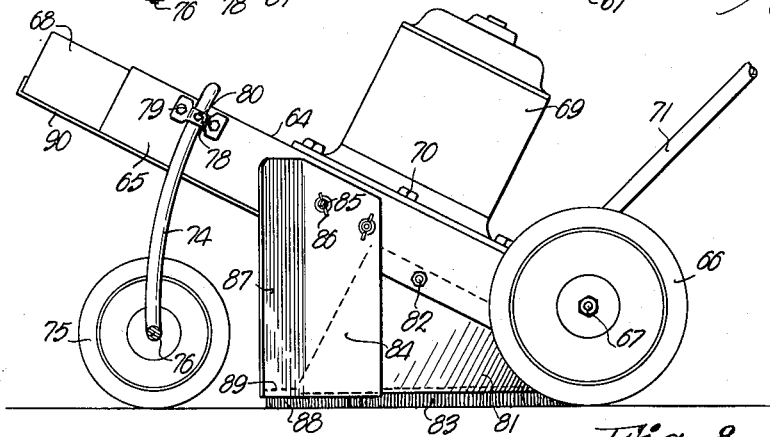
FIG. 8 is a side view of the second modification shown in FIG. 7, the apparatus adjusted to the upper position for snow removal use.
Figure 9:
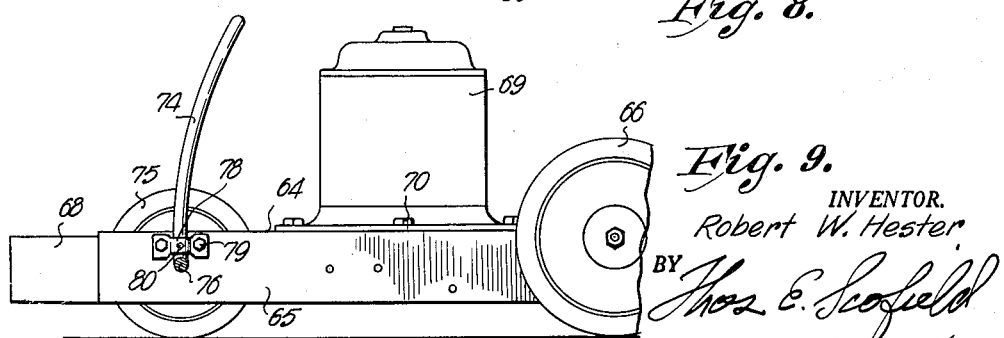
FIG. 9 is a side view of the second modification of FIGS. 7 and 8, the apparatus in the lower position for lawn mower use.

Referring now to the second modification of the invention as shown in FIGS. 7-9, this modification differs from that previously described only in the form of the elevating means for the front end of the housing, the engagement of said elevating means with the front of the housing and the form of the outwardly extending skirt which clears the path in front of the rear wheels. In the latter instance, the secondary modification illustrates a form of snow deflector wherein the snow or leaves to be picked up or removed are deflected inwardly to be picked up by the secondary skirt and directed into the path of the whirling blade.

Referring now to FIG. 7, top plate 64 is similar to the top plate 23 of the preferred modification except that it is not inwardly angled at the front end thereof and has downwardly extending side flanges 65 thereon positioned normal to the top plate itself. There may or may not be a downwardly extending rearmost flange analogous to flange 25. The depth of side flanges 65 is essentially equal to that of the essentially spiral skirt which is fixed to the underside of the top plate 64. Rear wheels 66 are mounted on axles 67 which are fixed to the underside of top plate 64 in the same manner as shown in the previous modification. Again, these axles 67 may be separate stub axles or a single continuous axle either fixed to the underside of the top plate or to the top side thereof. The top plate 64 extends preferably slightly rearwardly of the rear axles 67 and is pivotal therearound.

An essentially spiral skirt (not seen in these views) identical in form to that shown in the modification of FIGS. 1–6 is fixed normal to the bottom of the top plate 64 with the opening defining the essential spiral form thereof adjacent the front end of the top plate. The wall of the skirt which defines the essential spiral form thereof is formed to extend essentially tangentially to the curvature of the skirt in the direction of rotation of the blade. This extended wall is shown at 68. All of the relationships set forth relative the depth of the spiral skirt, its rearward extension relative the rear axles and its downward extension relative thereto also are the same as set forth relative the preferred modification to permit upward tilting of the front end of the housing formed by the top plate and spiral skirt using the rear axles as pivot points.

Power plant 69 is fixed to the top plate by bolts 70 and a drive shaft-blade combination as previously described relative the preferred modification is attached thereto. Handle 71 is received in mounting flanges 72 having bolts 73.

Turning now to the structures differing essentially from the preferred modification, means for holding or supporting the front end of the housing at various elevated positions are provided mountable relative the front end of said housing on each side thereof. The supporting means are extendable above the level of said front wheel axles. As illustrated in the drawings, the supporting means comprise a pair of elevating rods 74 received in guide 78 adjacent the front end of the housing and extending substantially normal thereto. The rods 74 may be straight but are preferably formed curved rearwardly in an arc equivalent to the arc of a circle centered at the center of the axles of the rear wheels. One of said rods 74 is positioned on each side of the housing and a pair of front wheels 75 are mounted on substantially horizontal axles 76 fixed adjacent the bottom of said rods 74. Means are provided for maintaining the axles of the front wheels substantially at right angles to the sides of the top plate 64 and, as shown in the drawing, preferably comprise a shaft 77 extending between the upper ends of the rods 74 and fixed thereto. Means are also provided to fix the front end of said housing along the length of said rods 74 to position the front of said housing along the length thereof at any one of a plurality of vertical levels. Such means comprise, in the construction illustrated, circumferential guides 78 fixed to the downwardly extending side flanges 65 of the top plate by bolts 79 and engaging bolt 80 extending through the guides 78 to abut the surface of rod 74 and frictionally engage the same to fix the guide 78 along the length thereof. It is evident that a number of variations of means of engagement of the elevating means to the housing could be devised including some wherein the elevating means for the housing need not extend substantially normal to the top plate when the housing is in its lowermost position. However, it is essential that such engaging means provide for and permit upward extension of said elevating means when the front end of the housing is to be raised from its lowermost position into snow removal or leaf removal operation as desired.

A secondary skirt 81 is shown in FIG. 8 which is substantially equivalent in form to the secondary skirt 45 illustrated in FIGS. 1–6. The side bolts 82 aiding in the fixing of said secondary skirt relative the essentially spiral skirt are shown in FIG. 8. The dimensional relationships of the secondary skirt 81 relative the spiral skirt, the top plate 64 and the rear axles 67 are the same as set forth relative the preferred modification and will not be again repeated here. A brush 83 extends along the bottom edge of the secondary skirt 81 and, again, is the same in construction and operation as that shown in the preferred modification.

Outer skirt 81 is preferably mountable on downwardly extending flanges 65 by bolts 85 having wing nuts 86. Outer skirt 84 has forwardly angled portion 87 designed to deflect snow or leaves inwardly to be picked up by the secondary skirt 81, as well as clear the path for the rear wheels 66. The lower edge of outer skirt 84 preferably extends parallel to the ground at the same level as the lower edge of secondary skirt 81 when the front end of the inventive mechanism is at its desired or maximum elevation. Brush 88 is preferably fixed to the front portion of outer skirt 84 as shown at 89 and has the same characteristics as the brush on the outwardly extending portion 56 of the preferred modification shown in FIGS. 1–6.

In operation of the secondary modification of FIGS. 7–9, FIG. 9 shows the apparatus in the lawn mowing or grass cutting position with the housing essentially parallel to the ground. The guides 78 are positioned immediately above or resting on the front axles 76 with the locking bolt 80 holding them in such position. The operation of the grass cutting device utilizing a relatively low-pitch blade is the same as described relative the preferred modification. FIGS. 7 and 8 show the secondary modification in the leaf removal or snow removal position with the front end of the housing raised up relative the rear end thereof. To raise the front end of the housing, the locking bolts 80 are loosened and the guides 78 slid along the rods 74 to the desired upward level. The locking bolts 80 are then tightened on the rods 74. The abutment of the top plate 64 with the transverse shaft 77 may be made the measure of the proper upward motion of the front end of the housing. In this position, the device will function as a snow removal or leaf removal device but not as well as if the secondary skirt 81 with its brush 83, the outer skirt 84 with its brush 88 and the lower plate 90 were in position. Once the front end of the housing is raised as illustrated, the secondary skirt 81 may be bolted on with bolts 82, the outer skirts 84 attached with bolts 85 and wing nuts 86 and the bottom plate 90 affixed by means of bolts 91. The operation of the device in the upward position is the same as shown in the preferred modification and described relative thereto except that the forwardly angled skirt 87 deflects snow or leaves inwardly to be picked up by the secondary skirt 81.

From the foregoing, it will be seen that the invention is adapted to attain all the ends and objects hereinabove set forth, together with other advantages which are obvious and inherent to the structure described.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

Having thus described my invention, I claim:

1. A lawn mower having a plate-like member with a source of power thereon and a cutter therebelow, rear wheels mounted by axle means on the rear portion of said plate-like member, a side frame member on each side of said plate-like member, each side frame member pivoted to one of said axle means, a supporting wheel on a forward portion of each side frame member and adjustable fastening means interconnecting said plate-like member to said side frame members whereby the front portion of said mower may be elevated to transform the same into a snow blower.

2. Apparatus as in claim 1 wherein said frame members each comprise a pair of substantially parallel and vertically oriented sheets, each sheet having a slot therein, the adjustable fastening means interconnecting the plate-like member to said side frame members extending into said slots, each sheet pivoted to one said axle means, each supporting wheel is on a forward portion of a sheet, the said slots at all points thereof at least substantially equidistant from the centers of rotation of the rear wheels.

3. Apparatus as in claim 1 wherein each sheet is substantially triangular in form and two vertices of the triangle serve as the front and rear ends thereof.

4. Apparatus as in claim 1 wherein said side frame members are adapted to support the front portion of said mower in a plurality of vertically spaced positions, one of said positions at a vertical level substantially that of the rear portion of said mower, another of said positions at a vertical level substantially above that of the rear end of said mower at the highest adjustable position of the latter.

References Cited in the file of this patent

UNITED STATES PATENTS

| | | |
|---|---|---|
| 131,006 | Katz | Sept. 3, 1872 |
| 1,531,742 | Fahrney | Mar. 31, 1925 |
| 1,577,561 | Chiles | Mar. 23, 1926 |
| 2,671,299 | Orr | Mar. 9, 1954 |
| 2,675,660 | Barnard | Apr. 20, 1954 |
| 2,675,661 | Titzer | Apr. 20, 1954 |
| 2,695,071 | Hupp | Nov. 23, 1954 |
| 2,719,396 | Morris et al. | Oct. 4, 1955 |
| 2,732,638 | Leufvenius | Jan. 31, 1956 |
| 2,743,538 | Linzy | May 1, 1956 |
| 2,763,116 | Flinchbaugh et al. | Sept. 18, 1956 |
| 2,809,389 | Collins et al. | Oct. 15, 1957 |

FOREIGN PATENTS

| | | |
|---|---|---|
| 637,832 | Great Britain | May 24, 1950 |